United States Patent
Gerst et al.

(10) Patent No.: US 9,574,077 B2
(45) Date of Patent: Feb. 21, 2017

(54) PROCESS FOR PREPARING AQUEOUS POLYMER DISPERSIONS FOR ADHESIVES

(71) Applicant: BASF SE, Ludwigshafen (DE)

(72) Inventors: Matthias Gerst, Neustadt (DE); Gerhard Auchter, Bad Duerkheim (DE); Gledison Fonseca, Mannheim (DE); Cornelis Petrus Beyers, Altrip (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/987,394

(22) Filed: Jan. 4, 2016

(65) Prior Publication Data

US 2016/0115310 A1    Apr. 28, 2016

Related U.S. Application Data

(62) Division of application No. 12/937,668, filed as application No. PCT/EP2009/054396 on Apr. 14, 2009, now Pat. No. 9,273,236.

(30) Foreign Application Priority Data

Apr. 15, 2008 (EP) .................... 08154546

(51) Int. Cl.
  *C08F 2/16*    (2006.01)
  *C08L 19/02*   (2006.01)
  *C08L 25/04*   (2006.01)
  *C08L 33/12*   (2006.01)
  *C08F 220/12*  (2006.01)
  *C09J 133/06*  (2006.01)

(52) U.S. Cl.
  CPC .............. *C08L 33/12* (2013.01); *C08F 220/12* (2013.01); *C08L 25/04* (2013.01); *C09J 133/066* (2013.01); *Y10T 428/2852* (2015.01)

(58) Field of Classification Search
  CPC ......... C08L 25/04; C08L 33/12; C08F 220/12; C09J 133/066
  See application file for complete search history.

(56) References Cited

U.S. PATENT DOCUMENTS

| | | |
|---|---|---|
| 5,430,092 A | 7/1995 | Aydin et al. |
| 6,214,925 B1 | 4/2001 | Schuler et al. |
| 6,225,401 B1 | 5/2001 | Rehmer et al. |
| 6,359,092 B1 | 3/2002 | Harvey et al. |
| 6,620,870 B1 | 9/2003 | Gerst et al. |
| 6,759,490 B1 | 7/2004 | Gerst et al. |
| 2006/0229405 A1 | 10/2006 | Westerman et al. |
| 2008/0124538 A1 | 5/2008 | Griffith et al. |
| 2008/0124543 A1 | 5/2008 | Urban et al. |
| 2009/0163655 A1 | 6/2009 | Shocker et al. |
| 2009/0270577 A1 | 10/2009 | Beyers et al. |

FOREIGN PATENT DOCUMENTS

| | | |
|---|---|---|
| DE | 4419 518 | 12/1995 |
| DE | 44 35 422 | 4/1996 |
| DE | 44 35 423 | 4/1996 |
| EP | 0 008 775 | 3/1980 |
| EP | 0 081 083 | 6/1983 |
| EP | 0 554 832 | 8/1993 |
| EP | 0 845 518 | 6/1998 |
| WO | 84 04491 | 11/1984 |
| WO | 97 11996 | 4/1997 |
| WO | 98 06763 | 2/1998 |
| WO | 98 07767 | 2/1998 |
| WO | 00 68335 | 11/2000 |

*Primary Examiner* — Alexa Neckel
*Assistant Examiner* — Marie Reddick
(74) *Attorney, Agent, or Firm* — Oblon, McClelland, Maier & Neustadt, L.L.P.

(57) ABSTRACT

The present invention relates to aqueous polymer dispersions having a polymer content of at least 55% by weight that are suitable for pressure sensitive adhesives. The invention also relates to a process for preparing these aqueous polymer dispersions and also to the use of the aqueous polymer dispersions in pressure sensitive adhesives and, respectively, pressure sensitive adhesive compositions, especially in pressure sensitive adhesives for transparent substrates, such as plastics labels. The aqueous polymer dispersions have a polymer content of at least 55% by weight, based on the total weight of the dispersion, the polymer being composed of ethylenically unsaturated monomers M and having a glass transition temperature below $-10°$ C., in which the dispersed polymer particles have a polymodal particle size distribution, in which at least 70% by weight have a particle diameter of below 350 nm.

16 Claims, 2 Drawing Sheets

PROCESS FOR PREPARING AQUEOUS POLYMER DISPERSIONS FOR ADHESIVES

CROSS REFERENCE TO RELATED APPLICATION(S)

This application is a divisional of U.S. application Ser. No. 12/937,668, filed on Oct. 13, 2010, which is a 35 U.S.C. 371 national stage patent application of international patent application PCT/EP2009/054396, filed on Apr. 14, 2009, the text of which is incorporated by reference, and claims foreign priority to EP 08154546.9 filed on Apr. 15, 2008, the entire content of which is incorporated herein by reference.

DESCRIPTION

The present invention relates to aqueous polymer dispersions having a polymer content of at least 55% by weight that are suitable for pressure sensitive adhesives. The invention also relates to a process for preparing these aqueous polymer dispersions and also to the use of the aqueous polymer dispersions in pressure sensitive adhesives and, respectively, pressure sensitive adhesive composition, especially in pressure sensitive adhesives for transparent substrates, e.g., plastics labels.

Pressure sensitive adhesives (PSAs) based on aqueous polymer dispersions, more particularly based on acrylate dispersions, find broad use for the production of self-adhesive products, such as self-adhesive sheets, adhesive tapes, labels, and the like. PSAs based on aqueous polymer dispersions comprise as their principal constituent a polymer which is dispersed in aqueous phase, which has a glass transition temperature of generally below −10° C., and which, when the dispersion is dried, forms a permanent, tacky film that adheres at room temperature even under low pressure to any of a very wide variety of surfaces.

The quality of the adhesive, or film of adhesive, is critically dependent on the properties of the aqueous polymer dispersion and of the polymer present therein. On the one hand, the adhesion of the film of adhesive is to be at a high level, in order to achieve good adhesion to the substrate to which bonding is to take place. This is frequently problematic particularly in the case of nonpolar substrates such as plastics and plastics sheets. At the same time, the internal strength (cohesion) of the film of adhesive is to be sufficiently great that cutting does not entail any stringing or edge exudation, which would lead to contamination of the cutting tools and to sticking of the cut surfaces.

It is desirable, moreover, if the polymer dispersions have a high polymer content, so that less water has to be evaporated when the self-adhesive layers are produced, and so that, accordingly, coating can be carried more efficiently and rapidly. Particularly in the case of modern coating techniques, such as the contactless curtain coating technique, polymer contents of at least 55% by weight are desirable. As their polymer content goes up, however, aqueous polymer dispersions, especially those of polymers having a low glass transition temperature, tend toward coagulation and bittiness. Moreover, there is a sharp increase in viscosity with increasing solids content.

With PSAs, moreover, the problem arises that the stability of the adhesive film under moisture exposure is not satisfactory. Frequently, moreover, exposure to moisture causes unattractive hazing of the adhesive film, which is undesirable on esthetic grounds particularly in the case of transparent substrates.

Aqueous polymer dispersions that are suitable for PSAs and have polymer contents of more than 55% by weight are known from WO 98/06763 A1, WO 98/07767 A1, and WO 00/68335 A1, for example. The PSAs described therein are notable for a high level of cohesion and adhesion. But layers of adhesive produced using polymer dispersions of these kinds tend toward hazing or whitening under moisture exposure, and this is undesirable in the context of their use for transparent labels.

EP 554832 A1 discloses aqueous polymer dispersions for PSAs that comprise an emulsion polymer with an ionic, copolymerized surface-active substance and also a nonpolymerizable hydrophobic polymer. The combination of ionic, copolymerizable surface-active substance and hydrophobic polymer results in good adhesive quality on nonpolar surfaces and in good moisture resistance of the adhesive film. The copolymerizable surface-active substances, however, are comparatively costly. Moreover, the viscosity of the polymer dispersions obtained is comparatively high.

EP 845518 A1 describes aqueous polymer dispersions for PSAs that comprise, in copolymerized form, $C_9$-$C_{13}$ alkyl (meth)acrylates and polymerizable surface-active substances. The polymer dispersions described therein, though, have comparatively low solids contents of below 50% by weight and are therefore not very suitable for modern coating techniques.

U.S. Pat. No. 6,359,092 discloses aqueous polymer dispersions for PSAs in which the polymer particles comprise, in copolymerized form, special ionic, polymerizable emulsifiers, and have a particle size of not more than 100 nm.

WO 97/11996 A1 discloses aqueous polymer dispersions based on acrylate esters, for PSAs, which comprise, in copolymerized form, a partially water-soluble monomer and in which the average particle size does not exceed a level of 150 nm. These polymer dispersions are indeed distinguished by improved whitening behavior. The viscosity of the resulting polymer dispersions, though, particularly at high solids contents, is unsatisfactorily high.

To summarize, it is found that the prior art does not disclose any polymer dispersions that are suitable for PSAs and that have a high solids content and acceptable viscosities, while at the same time displaying good adhesive qualities and a low tendency toward whitening.

The object on which the present invention is based, therefore, is to provide aqueous polymer dispersions for PSAs that on the one hand have a high solids content and an acceptable viscosity of preferably not more than 1500 mPa·s (Brookfield viscosity, determined in accordance with DIN EN ISO 3219, 23° C., 100 sec$^{-1}$) and at the same time, while having good adhesive qualities, i.e., high levels of cohesion and of adhesion, ensure a low tendency toward whitening under moisture exposure. It is desirable, moreover, for these properties to be achieved without the use of expensive polymerizable emulsifiers.

It has surprisingly been found that these and further objects are achieved by aqueous polymer dispersions based on ethylenically unsaturated monomers, having a polymer content of at least 55% by weight and a glass transition temperature of the polymer present therein of not more than −10° C., when the dispersed polymer particles have a polymodal particle size distribution, in which at least 70%, preferably at least 75%, more particularly at least 80%, more preferably at least 85% or at least 90% by weight of the polymer particles have a particle diameter of below 350 nm, more particularly below 340 nm, especially below 330 nm.

Figure 1:
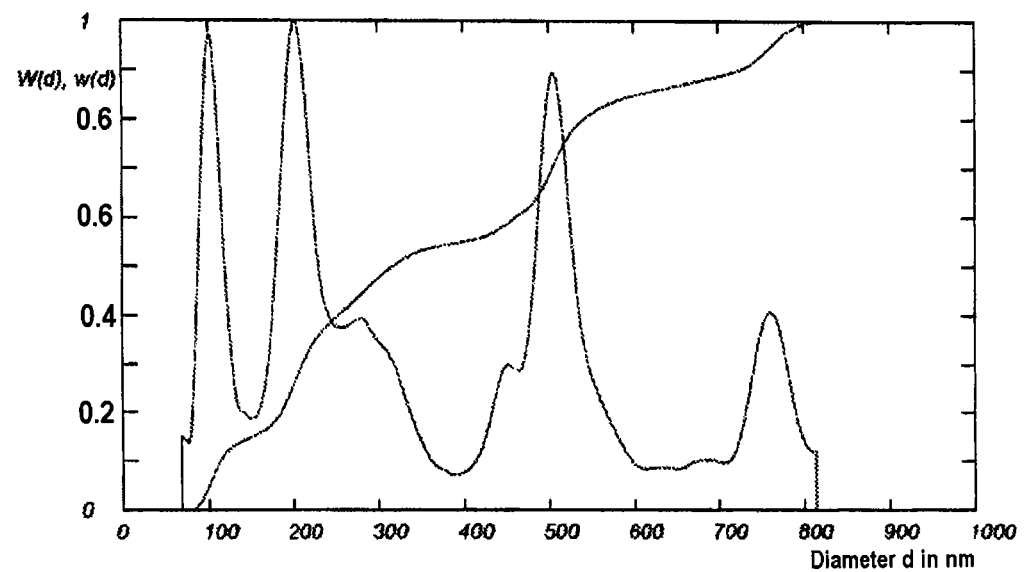
FIG. 1 is a graph showing particle size distribution w(d) of the polymer dispersion of comparative example 1.

The present invention accordingly provides aqueous polymer dispersions having a polymer content of at least 55%, more particularly at least 58%, and more preferably at least 60%, e.g., 55% to 75%, more particularly 58% to 72%, and more preferably 60% to 70%, by weight, based in each case on the total weight of the dispersion, in which the polymer is composed of ethylenically unsaturated monomers M and has a glass transition temperature of below −10° C., preferably of not more than −20° C., more particularly of not more than −30° C., in which the dispersed polymer particles have a polymodal particle size distribution, in which at least 70%, preferably at least 75%, more particularly at least 80%, more preferably at least 85% or at least 90% by weight of the polymer particles have a particle diameter of below 350 nm, more particularly below 340 nm, especially below 330 nm.

The polymer dispersions of the invention are associated with a series of advantages. For instance, even at polymer contents of at least 55% and more particularly at least 58%, e.g., at polymer contents in the range from 58% to 75% and more particularly in the range from 60% to 70%, by weight, the polymers dispersions of the invention feature comparatively low viscosities. In general, at 23° C., the polymer dispersions of the invention have a Brookfield viscosity (determined in accordance with DIN ISO EN 3219 at 23° C., 100 sec$^{-1}$) of not more than 1500 mPa·s, more particularly not more than 1300 mPa·s, and more preferably not more than 1000 mPa·s, e.g., 50 to 1500 mPa·s, more particularly 80 to 1300 mPa·s, and more particularly 100 to 1000 mPa·s. The polymer dispersions of the invention are notable, moreover, for good levels of cohesion and adhesion, and also for a low tendency on the part of the pressure sensitive adhesive films produced from them toward whitening under moisture exposure. Furthermore, the polymer dispersions of the invention feature good shear stabilities and a low tendency toward formation of coagulum and bits.

The particles sizes and particle size distributions reported here relate to the particle diameters at 23° C. that are determined by centrifuging and discriminated according to mass fractions. The determination is made typically by means of an ultracentrifuge in accordance with standard techniques, as for example in accordance with the methods described by H. Cölfen, "Analytical Ultracentrifugation of Nanoparticles" in Encyclopedia of Nanoscience and Nanotechnology, (American Scientific Publishers, 2004), pp. 67-88, or W. Mächtle and L. Börger in "Analytical Ultracentrifugation of Polymers and Nanoparticles", (Springer, Berlin, 2006).

The polymer dispersions of the invention have a polymodal particle size distribution. In other words, the distribution of the particle sizes of the polymer particles present in the dispersion, discriminated according to mass fractions, differs significantly from a monomodal, i.e., Gaussian distribution, and generally possesses at least two pronounced maxima, which differ generally by at least 50 nm, more particularly at least 100 nm. The polymodality of a particle size distribution can be characterized, conventionally, by the polydispersity index Q:

$$Q = \frac{d_{90} - d_{10}}{d_{50}}$$

in which $d_{10}$ is the particle diameter below which 10% by weight of the polymer particles fall, $d_{50}$ is the particle diameter below which 50% by weight of the polymer particles fall, and $d_{90}$ is the particle diameter below which 90% by weight of the polymer particles fall.

Whereas monomodal particle size distributions are generally characterized by a polydispersity index Q of below 0.3, e.g., 0.05 to 0.3, polymodal polymer dispersions customarily have a polydispersity index Q of well above 0.3, generally at least 0.4, frequently at least 0.5, and more particularly at least 0.6, e.g., in the range from 0.4 to 2, more particularly 0.5 to 1.5, and especially 0.6 to 1.2.

In the context of their use in PSAs, preferred polymer dispersions of the invention are those in which at least 70%, more particularly at least 75%, and especially at least 80% by weight of the polymer particles have a particle diameter of below 340 nm, or at least 80%, more particularly at least 85%, and especially at least 90% by weight of the polymer particles have a particle diameter of below 360 nm, and more particularly at least 80% and especially at least 90% by weight of the polymer particles have a particle diameter of below 330 nm. Correspondingly, the $d_{90}$ figure in formula Q is preferably not more than 350 nm and more particularly not more than 340 nm. Customarily the $d_{90}$ figure is in the range from 150 to 350 nm and especially in the range from 200 to 340 nm.

It is likewise preferred if not more than 20% and more particularly not more than 10% by weight of the polymer particles have a particle diameter of below 70 nm. It is particularly preferred if less than 20% and more particularly less than 10% by weight of the polymer particles have a particle diameter of below 80 nm or even of below 90 nm. Correspondingly, $d_{10}$ in formula Q is preferably at least 70 nm, more particularly at least 80 nm, and especially at least 90 nm, and is situated, for example, in the range from 70 to 150 nm, frequently in the range from 80 to 140 nm, and especially in the range from 90 to 130 nm.

In the polymer dispersions of the invention the weight-average particle diameter ($d_{50}$ figure) is situated customarily in the range from 90 to 320 nm.

In the context of the inventive use as PSAs, it has additionally proven advantageous if 10% to 60% and more particularly 15% to 50% by weight of the polymer particles in the polymer dispersion have a particle diameter in the range from 70 to 180 nm and especially in the range from 80 to 150 nm, and 40% to 90%, more particularly 50% to 85%, by weight of the polymer particles have a particle diameter in the range from 180 to 340 nm and especially in the range from 200 to 330 nm.

In accordance with the invention the aqueous polymer dispersions have a glass transition temperature of below −10° C., preferably of not more than −20° C., and more particularly not more than −30° C. In general, the glass transition temperature is situated in the range from −10 to −60° C., preferably in the range from −20 to −55° C., and more particularly in the range from −30 to −50° C. The glass transition temperatures reported here can be determined by typical methods such as differential thermoanalysis or differential scanning calorimetry (see, e.g., ASTM 3418/82, midpoint temperature).

The polymers in the aqueous polymer dispersions are composed of ethylenically unsaturated monomers M of the kind customarily employed in aqueous polymer dispersions for PSAs. The advantages of the invention are manifested more particularly in the case of aqueous polymer dispersions based on alkyl acrylates. In such polymer dispersions the polymer comprises generally at least 65%, frequently at least 70%, by weight of at least one $C_2$-$C_{12}$ alkyl acrylate in copolymerized form. $C_2$-$C_{12}$ Alkyl acrylates are also referred to below as monomers a). Correspondingly, the ethylenically unsaturated monomers M which constitute the polymer comprise generally at least 65%, frequently at least 70%, more particularly at least 75%, e.g., 65% to 100%, generally 65% to 99.8%, frequently 70% to 99%, and more particularly 75% to 95%, by weight, of at least one monomer selected from $C_2$-$C_{12}$ alkyl acrylates.

Preferred monomers a) are those $C_2$-$C_{12}$ alkyl acrylates whose homopolymer has a glass transition temperature, $T_g$, of not more than –10° C., more particularly not more than –20° C., and more particularly not more than –30° C. Examples of suitable $C_2$-$C_{12}$ alkyl acrylates are ethyl acrylate, propyl acrylate, isopropyl acrylate, n-butyl acrylate, 2-butyl acrylate, isobutyl acrylate, n-pentyl acrylate, n-hexyl acrylate, 2-ethylhexyl acrylate, n-heptyl acrylate, isoheptyl acrylate, n-octyl acrylate, isooctyl acrylate, 2-propylheptyl acrylate, decyl acrylate, isodecyl acrylate, dodecyl acrylate, and isododecyl acrylate, and mixtures thereof. Preferred $C_2$-$C_{12}$ alkyl acrylates are n-butyl acrylate, n-hexyl acrylate, 2-ethylhexyl acrylate, isooctyl acrylate, 2-propylheptyl acrylate, decyl acrylate, and isodecyl acrylate, and also mixtures of the aforementioned preferred alkyl acrylates, an example being a mixture of n-butyl acrylate with 2-ethylhexyl acrylate and/or with 2-propylheptyl acrylate.

In addition to the aforementioned alkyl acrylates, the monomers M which constitute the polymer comprise generally up to 35%, frequently up to 30%, more particularly up to 25%, e.g., 0.2% to 35%, frequently 1% to 30%, and more particularly 5% to 25%, by weight, based in each case on the total weight of the monomers M, of one or more monoethylenically unsaturated monomers of the kind that are customarily employed in PSAs and that are different from $C_2$-$C_{12}$ alkyl acrylates. Examples of suitable further monomers are as follows:

b) monoethylenically unsaturated monomers having a limited water solubility of generally not more than 60 g/l at 20° C. (monomers b) below), such as methyl acrylate, vinylaromatic monomers such as styrene, α-methylstyrene, vinyltoluene, 4-n-butylstyrene, and 4-tert-butylstyrene, vinyl esters of aliphatic $C_2$-$C_{10}$ carboxylic acids such as vinyl acetate and vinyl propionate, $C_1$-$C_{12}$ alkyl methacrylates, phenoxyalkyl esters of monoethylenically unsaturated $C_3$-$C_8$ monocarboxylic acids, more particularly 2-phenoxyethyl acrylate and methacrylate, monoethylenically unsaturated nitriles such as acrylonitrile and methacrylonitrile. The fraction of the monomers b) is frequently 1% to 30%, more particularly 4% to 25%, by weight, based on the total weight of the monomers M;

c) neutral, monoethylenically unsaturated monomers having a heightened water solubility of generally at least 80 g/l and more particularly at least 100 g/l at 20° C., examples being amides of monoethylenically unsaturated $C_3$-$C_8$ monocarboxylic acids such as acrylamide and methacrylamide, and hydroxy-$C_2$-$C_4$ alkyl esters of monoethylenically unsaturated $C_3$-$C_8$ monocarboxylic acids, more particularly $C_2$-$C_4$ hydroxyalkyl acrylates and methacrylates such as 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, and 4-hydroxybutyl methacrylate, and mixtures thereof. Fraction of the monomers c) as a proportion of the monomers M will generally not exceed 10% by weight and, where they are present, is customarily 0.1% to 10%, frequently 0.2% to 5%, and more particularly 0.5% to 4%, by weight, based on the total amount of the monomers M;

d) monoethylenically unsaturated monomers having an acid group, more particularly a carboxyl group (COOH) or a hydroxysulfonyl group ($SO_3H$), and salts thereof, examples being monoethylenically unsaturated $C_3$-$C_8$ monocarboxylic acids such as acrylic acid, methacrylic acid, crotonic acid, and isocrotonic acid, monoethylenically unsaturated $C_4$-$C_8$ dicarboxylic acids such as maleic acid, fumaric acid, and itaconic acid, and monoethylenically unsaturated sulfonic acids such as vinylsulfonic acid, methallylsulfonic acid, 2-acrylamido-2-methylpropanesulfonic acid. The fraction of the monomers having at least one acid group, where they are present, is 0.1% to 5%, more particularly 0.2% to 3%, and especially 0.5% to 2.5%, by weight, based on the total amount of the monomers M. Preferred monomers d) are those having at least one carboxyl group, and more particularly acrylic acid and methacrylic acid, and also mixtures thereof.

In one preferred embodiment of the invention, the monomers M which constitute the polymer comprise 0.1% to 30%, frequently 1% to 30%, and more particularly 4% to 25% by weight of monoethylenically unsaturated monomers b), which are selected preferably from methyl acrylate, $C_1$-$C_{12}$ alkyl methacrylates, and vinylaromatic monomers. Particularly preferred monomers b) are methyl acrylate, $C_1$-$C_4$ alkyl methacrylates, more particularly methyl methacrylate, and styrene. Among these, more particular preference is given to those polymer dispersions in which the monomers M, based on their total weight, comprise 1% to 30%, more particularly 3% to 20%, by weight of at least one first monomer b (monomer b.1) selected from methyl acrylate, $C_1$-$C_4$ alkyl methacrylates, especially methyl methacrylate, and mixtures thereof, and up to 5%, e.g., 0.1% to 5%, more particularly 0.5% to 4%, and especially 1% to 3%, by weight, of at least one vinylaromatic monomer (monomers b.2), especially styrene, the total amount of the monomers b.1 plus b.2 being 1% to 30% and more particularly 4% to 25%, by weight, based on the total weight of the monomers M.

In addition it has proven advantageous if the monomers M comprise at least one monoethylenically unsaturated monomer having at least one hydroxyalkyl group. These monomers are also referred to below as monomers c). Preferred monomers c) are selected from $C_2$-$C_4$ hydroxyalkyl acrylates and methacrylates such as 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 4-hydroxybutyl acrylate, and 4-hydroxybutyl methacrylate. The fraction of the monomers c) as a proportion of the monomers M is customarily 0.1% to 10%, frequently 0.5% to 5%, and more particularly 1% to 4%, by weight, based on the total amount of the monomers M.

It has further proven advantageous if the monomers M which constitute the polymer comprise not more than 5% by weight of monoethylenically unsaturated monomers having at least one acid group (monomers d) below). The fraction of the monomers having at least one acid group, where they are present, is 0.1% to 5%, by weight, more particularly 0.2% to 3%, and especially 0.5% to 2.5%, by weight, based on the total amount of the monomers M. Preferred monomers d) are those having at least one carboxyl group, and more particularly acrylic acid and methacrylic acid, and also mixtures thereof.

The polymer of the invention may, besides the aforementioned monoethylenically unsaturated monomers, also comprise small amounts of polyethylenically unsaturated monomers, which when the polymer is prepared result in crosslinking. The fraction of such monomers, however, will generally not exceed 1%, more particularly 0.5%, and especially 0.1%, by weight, based on the total amount of the monomers M which constitute the polymer. Examples of polyethylenically unsaturated monomers are diesters and triesters of ethylenically unsaturated carboxylic acids, more particularly the bis- and trisacrylates of diols or polyols having 3 or more OH groups, examples being the bisacrylates and the bismethacrylates of ethylene glycol, diethylene glycol, triethylene glycol, neopentyl glycol or polyethylene glycols, vinyl and allyl esters of saturated or unsaturated dicarboxylic acids, and the vinyl and allyl esters of monoethylenically unsaturated monocarboxylic acids.

In one preferred embodiment of the present invention the polymer is composed to an extent of at least 99%, more particularly at least 99.5%, and especially at least 99.9%, or 100%, by weight, of monoethylenically unsaturated monomers M, the monomers M in that case preferably comprising the following monomers:
a) 65% to 99.8%, more particularly 70% to 99%, and especially 75% to 95% by weight of monomers a) selected from $C_2$-$C_{12}$ alkyl acrylates and mixtures thereof;
b) 0.1% to 35%, more particularly 1% to 30%, and especially 4% to 25% by weight of monomers b) selected from methyl acrylate, $C_1$-$C_{12}$ alkyl methacrylates, and vinylaromatic monomers, more particularly from methyl acrylate, $C_1$-$C_4$ alkyl methacrylates, and styrene, and especially from methyl acrylate, methyl methacrylate, and styrene, and also from mixtures thereof;
c) 0.1% to 10%, more particularly 0.2% to 5%, and especially 0.5% to 4% by weight of monomers c) selected from monoethylenically unsaturated monomers having at least one hydroxyalkyl group, and more particularly from the abovementioned $C_2$-$C_4$ hydroxyalkyl acrylates and methacrylates, and also mixtures thereof; and
d) 0% to 5%, frequently 0.1% to 5%, more particularly 0.2% to 3%, and especially 0.5% to 2.5% by weight of monomers d) selected from monoethylenically unsaturated monomers having at least one acid group, more particularly monoethylenically unsaturated $C_3$-$C_6$ monocarboxylic acids, and especially acrylic acid and methacrylic acid, and also mixtures thereof.

In one particularly preferred embodiment of the present invention the polymer is composed to an extent of at least 99%, more particularly at least 99.5%, and especially at least 99.9%, or 100%, by weight of monoethylenically unsaturated monomers M, the monomers M in that case preferably comprising the following monomers:
a) 65% to 99.8%, more particularly 70% to 99%, and especially 75% to 95% by weight of monomers a) selected from $C_2$-$C_{12}$ alkyl acrylates and mixtures thereof;
b.1) 0.1% to 35%, more particularly 1% to 30%, and especially 3% to 20% by weight of monomers b.1) selected from methyl acrylate and $C_1$-$C_{12}$ alkyl methacrylates, more particularly from methyl acrylate and methyl methacrylate, and also from mixtures thereof;
b.2) 0.1% to 5%, more particularly 0.5% to 4%, especially 1% to 3%, by weight of at least one vinylaromatic monomer (monomers b.2), especially styrene;
c) 0.1% to 10%, more particularly 0.2% to 5%, and especially 0.5% to 4% by weight of monomers c) selected from monoethylenically unsaturated monomers having at least one hydroxyalkyl group, and more particularly from the abovementioned $C_2$-$C_4$ hydroxyalkyl acrylates and methacrylates, and also mixtures thereof; and
d) 0% to 5%, frequently 0.1% to 5%, more particularly 0.2% to 3%, and especially 0.5% to 2.5% by weight of monomers d) selected from monoethylenically unsaturated monomers having at least one acid group, more particularly monoethylenically unsaturated $C_3$-$C_6$ monocarboxylic acids, and especially acrylic acid and methacrylic acid, and also mixtures thereof.

Besides the polymer, the aqueous polymer dispersions customarily further comprise at least one surface-active substance for stabilizing the polymer particles. These substances include ionic and nonionic emulsifiers and also ionic and nonionic protective colloids or stabilizers. Emulsifiers, in contrast to protective colloids, are understood to be surface-active substances whose molecular weight (number average) is typically below 2000 g/mol and especially below 1500 g/mol. Protective colloids, in turn, are typically water-soluble polymers having a number-average molecular weight of more than 2000 g/mol, in the range, for example, from 2000 to 100 000 g/mol, and more particularly in the range from 5000 to 50 000 g/mol. Protective colloids and emulsifiers can of course be used in a mixture.

The amount of surface-active substance is situated typically in the range from 0.1% to 10%, preferably 0.2% to 5%, by weight, based on 100% by weight of polymer or on 100% by weight of the monomers M which constitute the polymer.

The polymer dispersions of the invention, besides the polymer, preferably comprise exclusively emulsifiers. More particularly it has been found appropriate for the polymer dispersion to comprise a combination of at least one anionic and at least one nonionic emulsifier as surface-active substance.

The anionic emulsifiers typically include aliphatic carboxylic acids having generally at least 10 C atoms and also salts thereof, more particularly their ammonium salts and alkali metal salts, aliphatic, araliphatic, and aromatic sulfonic acids having generally at least 6 C atoms and also their salts, more particularly their ammonium salts and alkali metal salts, sulfuric monoesters of ethoxylated alkanols and alkylphenols, and also their salts, more particularly their ammonium salts and alkali metal salts, and also alkyl, aralkyl, and aryl phosphates, including phosphoric monoesters of alkanols and alkylphenols.

Examples of suitable anionic emulsifiers are as follows: alkali metal salts of dialkyl esters of sulfosuccinic acid, and also alkali metal salts and ammonium salts of alkyl sulfates (alkyl radical: $C_8$ to $C_{12}$), of sulfuric monoesters of ethoxylated alkanols (EO degree: 4 to 30, alkyl radical: $C_{12}$ to $C_{18}$), of sulfuric monoesters of ethoxylated alkylphenols (EO degree: 3 to 50, alkyl radical: $C_4$ to $C_9$), of alkylsulfonic acids (alkyl radical: $C_{12}$ to $C_{18}$), and of alkylarylsulfonic acids (alkyl radical: $C_9$ to $C_{18}$). Examples of suitable emulsifiers are also the below-indicated compounds of the general formula

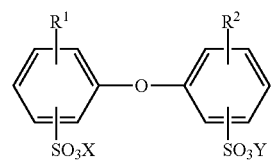

in which $R^1$ and $R^2$ are hydrogen or $C_4$ to $C_{18}$ alkyl and are not simultaneously hydrogen, and X and Y can be alkali metal ions and/or ammonium ions. Preferably $R^1$ and $R^2$ are linear or branched alkyl radicals having 6 to 14 C atoms or hydrogen, and more particularly having 6, 12, and 16 C atoms, with $R^1$ and $R^2$ not both simultaneously being hydrogen. X and Y are preferably sodium, potassium or ammonium ions, with sodium being particularly preferred. Particularly advantageous compounds are those in which X and Y are sodium, $R^1$ is a branched alkyl radical having 12 C atoms, and $R^2$ is hydrogen or has one of the definitions other than hydrogen stated for $R^1$. Use is frequently made of technical mixtures which have a fraction of 50% to 90% by weight of the monoalkylated product, an example being Dowfax® 2A1 (trademark of the Dow Chemical Company).

Suitable nonionic emulsifiers are customarily ethoxylated alkanols having 8 to 36 C atoms in the alkyl radical, ethoxylated mono-, di-, and tri-alkylphenols having customarily 4 to 12 C atoms in the alkyl radicals, the ethoxylated alkanols and alkylphenols customarily having a degree of ethoxylation in the range from 3 to 50.

Further suitable emulsifiers are found, for example, in Houben-Weyl, Methoden der organischen Chemie, volume 14/1, Makromolekulare Stoffe [Macromolecular compounds], Georg Thieme Verlag, Stuttgart, 1961, pp. 192 to 208.

Suitable emulsifiers are available commercially, as for example under the trade names Dowfax® 2 A1, Emulan® NP 50, Dextrol® OC 50, Emulgator 825, Emulgator 825 S, Emulan® OG, Texapon® NSO, Nekanil® 904 S, Lumiten® I-RA, Lumiten® I-SC, Lumiten® E 3065, Disponil® FES 77, Lutensol® AT 18, Steinapol VSL, Emulphor NPS 25.

The systems in question, in accordance with the invention, are aqueous polymer dispersions—that is, the polymer takes the form of a heterogeneous phase composed of finely divided particles, having the polymer particle sizes indicated above, in a homogeneous aqueous phase. The homogeneous aqueous phase may comprise—in addition to water and also the auxiliaries that are customarily used during preparation, such as surface-active substances, acids, bases and decomposition products from the emulsion polymerization—small amounts of water-miscible organic solvents. The fraction of the last-mentioned components will customarily not exceed 1% by weight, based on the total weight of the dispersion.

For preparing the aqueous polymer dispersions of the invention it is possible in principle to proceed by employing the processes known from the prior art for preparing polymer dispersions having a polymodal polymer particle size distribution. Examples include the mixing of at least two different polymer dispersions with a monomodal particle size distribution, the polymer dispersions differing in their average particle size, as described in EP 81083 and WO 84/04491, for example. Another possibility is to prepare the polymer dispersions of the invention by means of a free-radical aqueous emulsion polymerization of ethylenically unsaturated monomers in the presence of two different seed latices which differ in their average particle size. A process of that kind is described likewise in EP 81083. Another procedure that may be adopted for preparing the polymer dispersions of the invention is to carry out a free-radical aqueous emulsion polymerization of the monomers M by a monomer feed process, in which, in the course of the polymerization, when some of the monomers have already undergone polymerization, a larger quantity of emulsifier is added, which initiates the formation of a new particle generation. A process of that kind is known from EP 8775, for example.

For the polymer dispersions of the invention, however, it has proven advantageous to employ the below-described process of a free-radical aqueous emulsion polymerization of the monomers M which constitute the polymer. In this process, a free-radical, aqueous emulsion polymerization of the ethylenically unsaturated monomers M is carried out according to a monomer feed process in which at least one particulate seed polymer 1 is included in the initial charge to the polymerization reactor, and at least one further seed polymer 2, in the form of an aqueous dispersion, is added in the course of the polymerization.

A monomer feed process, here and below, means that at least 95% and more particularly at least 99% of the monomers to be polymerized are added under polymerization conditions to a polymerization reactor in which there is already a first particulate seed polymer located, typically in the form of an aqueous dispersion of the seed polymer.

The term "seed polymer" is understood by the skilled worker to refer to a finely divided polymer in the form of an aqueous polymer dispersion. The weight-average particle size of the seed polymers used in the process of the invention (weight average, $d_{50}$ figure) is customarily below 200 nm, frequently in the range from 10 to 150 nm, and more particularly in the range from 20 to 120 nm. The initial-charge seed polymer, i.e., the first particulate seed polymer 1, located in the polymerization reactor at the start of the polymerization, has a weight-average particle size customarily in the range from 20 to 150 nm and preferably in the range from 25 to 120 nm. As for the further seed polymer 2, added in the course of the polymerization, the weight-average particle size is preferably in the range from 5 to 120 nm and more particularly in the range from 10 to 100 nm.

The monomer composition of the seed polymers is of minor importance. Suitability is possessed both by seed polymers which are composed predominantly of vinylaromatic monomers and more particularly of styrene (so-called styrene seed), and by seed polymers which are composed predominantly of $C_1$-$C_{10}$ alkyl acrylates and/or $C_1$-$C_{10}$ alkyl methacrylates, such as from a mixture of butyl acrylate and methyl methacrylate, for example. Besides these principal monomers, which typically account for at least 80% by weight and more particularly at least 90% by weight of the seed polymer, the seed polymers may also comprise, in copolymerized form, monomers different from these, more particularly monomers having a heightened water solubility, examples being monomers having at least one acid function and/or neutral monomers with an increased water solubility. The fraction of such monomers will generally not exceed 20% and more particularly 10% by weight, and, where they are present, is situated typically in the range from 0.1% to 10% by weight, based on the total amount of the monomers which constitute the seed polymer.

In general, the first seed polymer 1 will be used in an amount of 0.1% to 2%, more particularly in an amount of 0.2% to 1%, by weight, based on the total amount of the monomers M to be polymerized. The first seed polymer is preferably what is called an acrylate seed.

The seed polymer 2, added in the course of the polymerization reaction, will customarily be used in an amount of 0.05% to 2%, more particularly in an amount of 0.1% to 1%, and especially in an amount of 0.1% to 0.5%, by weight, based on the total amount of the monomers to be polymerized. The seed polymer 2 is generally added at the earliest when at least 10% and more particularly at least 20% by weight of the monomers M to be polymerized are already located in the polymerization reactor. The addition of the seed polymer 2 is generally ended no later than when 90%, more particularly 80%, more preferably 70% or especially 60% of the monomers to be polymerized are located in the reaction reactor. The seed polymer 2 may be added in one portion, in two or more portions, or continuously. Particularly preferred is what is called a "seed shot", where the seed polymer is introduced into the polymerization reactor under polymerization conditions over a short time period, generally not exceeding 5 minutes. The seed shot takes place customarily when 10% to 90%, more particularly 10% to 80%, more preferably 15% to 70%, and especially 20% to 60% by weight of the monomers M to be polymerized are located in the polymerization reactor.

Through the amount of the seed polymer 1 and/or through the ratio of seed polymer 1 to the monomers M it is possible to adjust the maximum particle size of the polymer particles in the dispersion. A small fraction of seed polymer 1, based on the monomers M, leads in general to larger polymer particles, whereas a larger amount of seed polymer 1 leads in general to smaller polymer particles. The time of the addition of the second seed polymer, and the weight ratio of seed polymer 2 to the monomers M, are used to make adjustments, in particular, to the particle size and the weight fraction of the smaller polymer particles in the dispersion. The earlier the second seed polymer 2 is added, the higher the fraction of smaller polymer particles in the polymer dispersion. At the same time, however, there is an increase in the size of the smaller particles, and so the $d_{10}$ figure on early addition of the seed polymer 2 is larger than in the case of a later addition. Similar considerations apply to the amount of the seed polymer 2. The larger the ratio of seed polymer 2 to the monomers to be polymerized, the greater the fraction of smaller polymer particles and the greater the $d_{10}$ figure for the particle size distribution.

The free-radical aqueous emulsion polymerization is performed customarily in the presence of surface-active substances as described above. In the process of the invention it is preferred to use exclusively emulsifiers. More particularly it has been found appropriate to use a combination of at least one anionic emulsifier and at least one nonionic emulsifier as surface-active substance.

The surface-active substances are used customarily in amounts of 0.1% to 10%, more particularly in amounts of 0.2% to 5%, by weight, based on the weight of the monomers M to be polymerized.

The initiators used for the free-radical emulsion polymerization are typically water-soluble substances that form free radicals.

Water-soluble initiators for the emulsion polymerization are organic or inorganic peroxide compounds, i.e., compounds having at least one peroxide or hydroperoxide group, examples being ammonium salts and alkali metal salts of peroxodisulfuric acid, e.g., sodium peroxodisulfate, hydrogen peroxide, or organic peroxides, e.g., tert-butyl hydroperoxide.

Also suitable are what are called reduction-oxidations (redox) initiator systems. The redox initiator systems are composed of at least one, usually inorganic reducing agent and one organic or inorganic oxidizing agent. The oxidizing component comprises, for example, the peroxide compounds already stated above. The reducing components comprise, for example, alkali metal salts of sulfurous acid, such as sodium sulfite, sodium hydrogen sulfite, alkali metal salts of disulfurous acid such as sodium disulfite, bisulfite addition compounds with aliphatic aldehydes and ketones, such as acetone bisulfite, or reducing agents such as hydroxymethanesulfinic acid and its salts, or ascorbic acid. The redox initiator systems may be used in conjunction with soluble metal compounds whose metallic component is able to occur in a plurality of valence states. Typical redox initiator systems are, for example, ascorbic acid/iron(II) sulfate/sodium peroxidisulfate, tert-butyl hydroperoxide/sodium disulfite, tert-butyl hydroperoxide/Na hydroxymethanesulfinic acid. The individual components, the reducing component, for example, may also be mixtures, an example being a mixture of the sodium salt of hydroxymethanesulfinic acid and sodium disulfite.

The stated initiators are used mostly in the form of aqueous solutions, the lower concentration being determined by the amount of water that is acceptable in the dispersion, and the upper concentration by the solubility of the respective compound in water. Generally speaking, the concentration is 0.1% to 30%, preferably 0.5% to 20%, more preferably 1.0% to 10%, by weight, based on the solution.

The amount of the initiators is generally 0.1% to 10%, preferably 0.5% to 5%, by weight, based on the monomers to be polymerized. It is also possible for two or more different initiators to be used in the emulsion polymerization.

In the polymerization it is possible to use regulators, in amounts of 0% to 1% by weight, for example, based on the monomers M to be polymerized. By this means the molar mass of the polymer is reduced. Suitability is possessed, for example, by compounds having a thiol group, such as tert-butyl mercaptan, mercaptoethanol, thioglycolic acid, thioglycolic acid ethyl ester, mercaptopropyltrimethoxysilane, and tert-dodecyl mercaptan. Optionally it is of advantage to add the regulator, in the course of the polymerization, over a relatively long time period, as for example in parallel with the addition of the monomers M. The addition may then be made at a continuous feed rate or with an increasing or decreasing feed rate.

The process of the invention is performed as feed process, i.e., at least 95% of the monomers M to be polymerized are added to the polymerization reactor under polymerization conditions in the course of the polymerization. The addition may be made continuously or in stages. In the course of the polymerization the monomer composition may be changed once, two or more times or else continuously (gradient procedure).

A preferred procedure in the process of the invention is to introduce in the initial charge the first seed polymer 1 in the form of an aqueous dispersion, optionally together with water, to heat the initial charge to polymerization temperature, and then to add a portion of the polymerization initiator, for example, 1% to 20% and more particularly 5% to 15% by weight, based on the total amount of the initiator. An alternative procedure is first to add the portion of the polymerization initiator and then to carry out heating to polymerization temperature. At this point in time the polymerization reactor receives preferably less than 1% by weight of the monomers M to be polymerized. This is followed by the addition of the monomers to be polymerized to the polymerization reactor under polymerization conditions. The addition takes place typically over a relatively long period of at least 30 minutes, for example, 30 minutes to 10 h, more particularly over a period of 1 h to 6 h. As already described, the addition may take place with a constant, increasing or decreasing rate of addition. In one first preferred embodiment, the addition takes place at the beginning of the polymerization, with an increasing feed rate. In another, likewise preferred embodiment of the process of the invention, the addition takes place with a constant addition rate. The monomers can be added as they are. Preferably the monomers are added in the form of an aqueous monomer emulsion, which customarily comprises at least part, preferably at least 70% by weight, of the surface-active substances used in the emulsion polymerization. This monomer emulsion customarily has a monomer content in the range from 60% to 85% and more particularly in the range from 65% to 80% by weight. It is possible in principle to add the monomers or the monomer emulsion to the polymerization reactor via two or more feed streams, it being possible for the monomer composition of the individual feed streams to be different from one another. In general, however, it is sufficient to add the monomers as a mixture via one feed stream into the polymerization reactor. Where the monomers are added to the polymerization reactor in the form of an aqueous emulsion, it can be of advantage to carry out fresh emulsification of the monomers immediately prior to their addition and in line with their addition in the polymerization reactor, by a continuous method, for example. It is also possible to prepare the monomer emulsion first of all and then to introduce it into the polymerization reactor at the desired addition rate.

Typically, in parallel with the addition of monomer, at least a portion of the entirety of the polymerization initiator is added. Customarily at least 80% of the polymerization initiator needed for the emulsion polymerization, more particularly 85% to 95% of the polymerization initiator, is added to the polymerization reactor in the course of the polymerization reaction. The polymerization initiator may be added at a constant rate or with a changing rate, a decreasing or increasing rate, for example.

Polymerization temperature and polymerization pressure are of minor importance. The emulsion polymerization takes place customarily at temperatures in the range from 30 to 130, preferably 50 to 90° C. The polymerization pressure is situated typically in the region of atmospheric pressure, i.e., at ambient pressure, but may also be slightly above or below this, in the range from 800 to 1500 mbar, for example.

The polymerization medium may be composed either just of water or of mixtures of water and water-miscible liquids such as methanol. It is preferred to use just water.

In general it is advisable, after the end of the actual polymerization reaction, i.e., after the end of the addition of the monomers to be polymerized, or after a conversion of at least 95% of the monomers located in the polymerization reactor, to carry out a chemical and/or physical deodorization for the purpose of removing unpolymerized monomers. In general at least one chemical deodorization will be performed. A chemical deodorization is a postpolymerization phase which is initiated by addition of at least one further polymerization initiator, more particularly by means of one of the aforementioned redox initiator systems. Processes for this purpose are known, from DE-A-4435422, DE-A-4435423, and DE-A-4419518, for example. The lowering of the residual monomers may also take place through combined measures of chemical and physical deodorization, in which case the physical deodorization is preferably carried out after the chemical deodorization. The polymer dispersions thus obtained comprise preferably less than 1500 ppm, more particularly less than 1000 ppm, and more preferably less than 500 ppm of volatile organic fractions TVOC. TVOC (total volatile organic compounds) are all organic compounds having a boiling point of not more than 250° C. at 1 bar. The residual volatiles content is determined customarily in accordance with DIN 55649.

Before the polymer dispersion is used, it is customary for its pH to be adjusted to a value pH>4.5, more particularly a pH in the range from 5 to 8. The pH is customarily adjusted by addition of a base such as ammonia or an alkali metal hydroxide, preferably in the form of an aqueous solution. A preferred base is ammonia.

It has additionally proven advantageous if the aqueous polymer dispersion, after it has been prepared, is stabilized by addition of an anionic surface-active substance. Preferred for this purpose are the dialkyl esters of sulfosuccinic acid or their salts, more particularly the sodium salts, especially the dialkyl esters of sulfosuccinic acid having 6 to 12 C atoms per alkyl radical. The aqueous polymer dispersion is customarily admixed, following the emulsion polymerization, with 0.05% to 2% and more particularly with 0.1% to 1% by weight of an anionic surface-active substance of this kind.

In general the aqueous polymer dispersion will also be stabilized with a biocide.

The aqueous polymer dispersions of the invention are particularly suitable as an adhesive component in pressure sensitive adhesives (PSAs). Accordingly, the present invention further provides for the use of the here-described aqueous polymer dispersions in PSA compositions.

The PSA composition may be composed of the aqueous polymer dispersion alone. However, besides the aqueous polymer dispersion, the PSA composition may also comprise further adjuvants, of the kind that are usual in PSAs based on aqueous polymer dispersions. These include fillers, dyes, flow control agents, thickeners, biocides, and tackifiers (tackifying resins).

Tackifiers are, for example, natural resins, such as rosins and their derivatives formed by disproportionation or isomerization, polymerization, dimerization and/or hydrogenation. They may be present in their salt form (with, for example, monovalent or polyvalent counterions (cations)), or, preferably, in their esterified form. Alcohols used for the esterification may be monohydric or polyhydric. Examples are methanol, ethanediol, diethylene glycol, triethylene glycol, 1,2,3-propanethiol, pentaerythritol. Also used as tackifiers, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene. Polyacrylates which have a low molar weight can also be used as tackifiers. Preferably these polyacrylates have a weight-average molecular weight $M_w$ of below 30 000. The polyacrylates are composed preferably to an extent of at least 60%, more particularly at least 80%, by weight of $C_1$-$C_8$ alkyl (meth)acrylates. Preferred tackifiers are natural or chemically modified rosins. Rosins are composed predominantly of abietic acid or derivatives of abietic acid. The amount by weight of the tackifiers is preferably 0 to 100 parts by weight, more preferably 0 to 50 parts by weight, based on 100 parts by weight of polymer (solids/solids).

The polymer dispersions of the invention and PSA compositions are suitable in principle for producing pressure sensitive adhesive coatings on any desired substrates such as paper, plastics sheets, more particularly transparent plastics sheets, and metal or metallized plastics sheets or metallized paper. Examples of plastics sheets are films made of polyethylene, polypropylene, which may have been biaxially or monoaxially oriented, polyethylene terephthalate, polyvinyl chloride, polystyrene, polyamide, and polyvinyl acetate, and also laminate sheets, examples being polyethylene/polyethylene terephthalate, polyethylene/polyvinyl acetate, polyethylene/polyvinyl alcohol.

The thickness of the PSA coating is dependent on the desired application and is situated customarily in the range from 1 to 500 μm, more particularly in the range from 2 to 250 µm or 5 to 200 µm, corresponding to a coating of 1 to 500 g/m², more particularly 2 to 250 g/m², and especially 5 to 200 g/m².

The polymer dispersions or PSAs may be applied by means of typical methods to the substrates that are to be coated, such as by rolling, knife coating, spreading, pouring, etc., for example. It is also possible first to apply the polymer dispersions or PSAs to a release sheet, a release paper, for example, and to transfer the layer of PSA to the desired substrate using said sheet. The water present in the compositions can be removed in a typical way, for example by drying at temperatures in the range from 20 to 150° C., more particularly in the range from 50 to 150° C.

On account of their low tendency toward whitening, they are especially suitable for producing PSA coatings on transparent plastics sheets, more particularly for transparent plastics labels, which may be printed on one or both sides.

The examples below serve for illustration of the invention.

A PREPARATION AND CHARACTERIZATION OF THE POLYMER DISPERSIONS

Determination of particle sizes: the particle size was determined by the method described by H. Cölfen, "Analytical Ultracentrifugation of Nanoparticles" in Encyclopedia of Nanoscience and Nanotechnology, (American Scientific Publishers, 2004), pp. 67-88, at 23° C., on a 0.1-0.5% by weight dilution (based on solids content, light transmittance about 10%) of the polymer dispersion by means of an ultracentrifuge (Beckmann model XL) in a sedimentation field ramp from 600 to 40 000 rpm, corresponding to an acceleration of 2250 to 150 000 g, using a turbidity-based optical system (see also W. Mächtle and L. Börger in "Analytical Ultracentrifugation of Polymers and Nanoparticles", (Springer, Berlin, 2006); W. Mächtle in Analytical Ultracentrifugation in Biochemistry and Polymer Science, S. E. Härting et al. (editors), Cambridge, Royal Society of Chemistry, 1992, pp. 147-175; and in W. Mächtle, Makromolekulare Chemie 185 (1984), pages 1025-1039). The diluent used was $D_2O$ with 0.5 g/l Emulgator K30 (emulsifier; sodium salt of an alkanesulfonate).

Determination of viscosity: the Brookfield viscosity was determined in a method based on DIN EN ISO 3219 by means of a rotational viscometer (Physica MCR 301 rheometer with sample changer and CC27 measuring system, from Anton Paar) at 23° and a shear rate of 0 to 500 $sec^{-1}$). The figure reported is the value at 100 $sec^{-1}$.

The glass transition temperature was determined by means of DSC in accordance with the DSC method described in ASTM 3418/82, with determination of the midpoint temperature.

Light transmittance (LT): the LT value was determined photometrically using a photometer on a 0.01% by weight dilution of the dispersion at 23° C.

Ingredients:

Emulsifier solution 1: 58% strength by weight commercial solution of the sodium salt of a sulfuric monoester of a $C_{12}$-$C_{14}$ alkanol ethoxylate (30 EO).

Emulsifier solution 2: Dowfax® 2A1: 45% strength by weight solution of the sodium salt of a mixture of mono- and di-$C_{12}$-alkyl-bishydroxysulfonyl diphenyl ether.

Emulsifier solution 3: 58% strength by weight solution of the sodium salt of di-2-ethylhexylsulfosuccinate.

Seed dispersion 1: aqueous polymer dispersion of a styrene polymer having a solids content of 33% by weight and an average particle size (weight average, $d_{50}$) of 30 nm.

Seed dispersion 2: aqueous polymer dispersion of an acrylate polymer (65% by weight butyl acrylate, 34% by weight methyl methacrylate, 1% by weight acrylic acid) having a solids content of 41% by weight and an average polymer particle size (weight average, $d_{50}$) of 50 nm.

1. Comparative Example 1

A polymerization reactor was charged with 0.75 g of ascorbic acid in 206 g of deionized water. The mixture was heated to 90° C. 9.62 g of a 7% strength by weight aqueous solution of sodium peroxodisulfate were added, and, after a further 5 minutes, at 90° C., the addition of feed streams 1 and 2 was commenced. Feed stream 1 was metered in as follows:

0.4% over 6 minutes
3.8% over 22 minutes
7.6% over 22 minutes
11.4% over 22 minutes
76.8% over 2 hours 18 minutes Feed stream 2 was metered in over 3 hours 30 minutes. During the addition, the temperature in the reaction mixture was maintained at 90° C. After the end of feed steam 1, a further 40 g of deionized water were added. This was followed by successive neutralization with 15 g of 10% strength by weight aqueous sodium hydroxide solution and 7.5 g of 10% strength aqueous ammonia solution. A further 10 g of deionized water were added and then over an hour at 90° C. feed streams 3 and 4 were metered in. Subsequently 12.9 g of aqueous emulsifier solution 3 and 30 g of deionized water were added, and the batch was stirred at 90° C. for 15 minutes more and then left to cool to room temperature.

The polymer dispersion obtained had a solids content of 64.2% by weight, a pH of 5, and an LT (0.01% by weight) of 37%. The glass transition temperature was −42° C. The viscosity was 620 mPa·s.

The particle size distribution is shown in FIG. 1. The $d_{10}$, $d_{50}$, and $d_{90}$ values are reported in table 1.

Feed stream 1: 1920 g of an aqueous emulsion of 15 g of acrylic acid, 29.7 g of 2-hydroxypropyl acrylate, 29.4 g of styrene, 118.8 g of methyl acrylate, 120.3 g of methyl methacrylate, and 1186 g of 2-ethylhexyl acrylate in deionized water, containing 70.3 g of emulsifier solution 1, 6.7 g of emulsifier solution 2, and 10.3 g of emulsifier solution 3.

Feed stream 2: 77.14 g of a 7% strength by weight aqueous sodium peroxodisulfate solution.

Feed stream 3: 22.5 g of a 10% strength by weight aqueous solution of tert-butyl hydroperoxide.

Feeds stream 4: 18 g of a 10% strength by weight aqueous solution of sodium hydroxymethylsulfinate.

2. Comparative Example 2

A polymerization reactor was charged with 0.7 g of ascorbic acid in 192 g of deionized water. The mixture was heated to 90° C. 8.98 g of a 7% strength by weight aqueous solution of sodium peroxodisulfate were added, and, after a further 5 minutes, at 90° C., the addition of feed streams 1 and 2 was commenced, in the manner described for comparative example 1. During the addition, the temperature in the reaction mixture was maintained at 90° C. 84 minutes after the start of feed streams 1 and 2, respectively, 9.76 g of seed dispersion 1 were added in one portion. After the end of feed streams 1 and 2, a further 37.5 g of deionized water were added. This was followed by successive neutralization with 14 g of 10% strength by weight aqueous sodium hydroxide solution and 7 g of 10% strength aqueous ammonia solution. A further 9.5 g of deionized water were added and then over an hour at 90° C. feed streams 3 and 4 were metered in. Subsequently 12.1 g of aqueous emulsifier solution 3 and 28 g of deionized water were added, and the batch was stirred at 90° C. for 15 minutes more and then left to cool to room temperature.

The $d_{10}$, $d_{50}$ and $d_{90}$ values are reported in table 1.

Feed stream 1: 1980 g of an aqueous emulsion of 14 g of acrylic acid, 27.7 g of 2-hydroxypropyl acrylate, 27.4 g of styrene, 110.9 g of methyl acrylate, 112.3 g of methyl methacrylate, and 1107.7 g of 2-ethylhexyl acrylate in deionized water, containing 65.6 g of emulsifier solution 1, 6.2 g of emulsifier solution 2, and 9.7 g of emulsifier solution 3.

Feed stream 2: 72 g of a 7% strength by weight aqueous sodium peroxodisulfate solution.

Feed stream 3: 21 g of a 10% strength by weight aqueous solution of tert-butyl hydroperoxide.

Feed stream 4: 16.8 g of a 10% strength by weight aqueous solution of sodium hydroxymethylsulfinate.

The polymer dispersion obtained had a solids content of 60.4% by weight, a pH of 5, and an LT (0.01% by weight) of 41%. The glass transition temperature was −42° C. The viscosity was 190 mPa·s.

The $d_{10}$, $d_{50}$, and $d_{90}$ values are reported in table 1.

3. Inventive Example 1

A polymerization reactor was charged with 15.2 g of seed dispersion 2 in 188.3 g of deionized water. The mixture was heated to 90° C. 8 g of a 7% strength by weight aqueous solution of sodium peroxodisulfate were added, and, after a further 4 minutes, at 90° C., the addition of feed streams 1 and 2, which were metered in at a constant feed rate over 4 h, was commenced. During the addition, the temperature in the reaction mixture was maintained at 90° C. 72 minutes after the start of feed streams 1 and 2, respectively, 8.71 g of seed dispersion 1 were added in one portion. After the end of feed streams 1 and 2, a further 40 g of deionized water were added. This was followed by neutralization with 16.3 g of 10% strength aqueous ammonia solution. A further 10 g of deionized water were added and then over an hour at 90° C. feed streams 3 and 4 were metered in. Subsequently 10.8 g of aqueous emulsifier solution 3 and 30 g of deionized water were added, and the batch was stirred at 90° C. for 15 minutes more and then left to cool to room temperature.

The polymer dispersion obtained had a solids content of 59.1% by weight, a pH of 6, and an LT (0.01% by weight) of 52%. The glass transition temperature was −42° C. The viscosity was 450 mPa·s.

Figure 3:
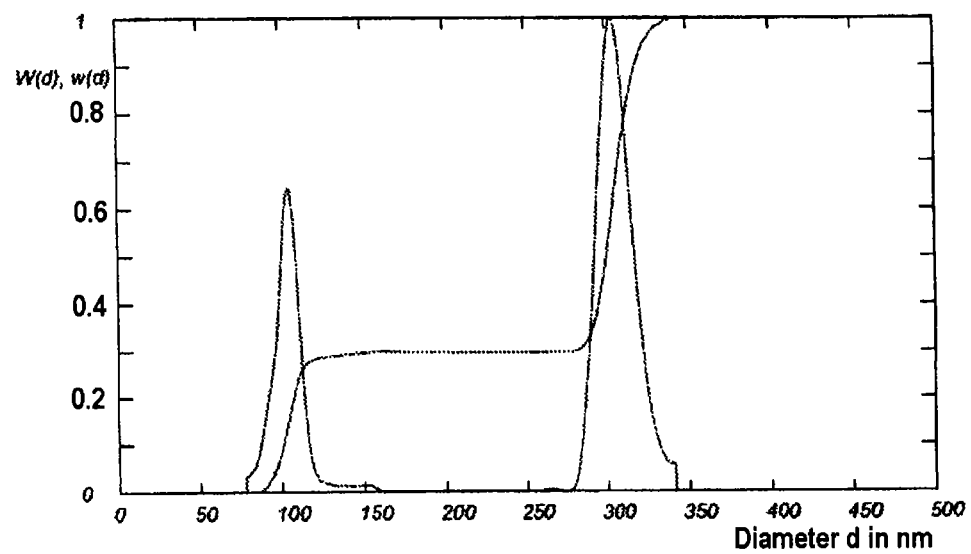
FIG. 3 is a graph showing particle size distribution w(d) of the polymer dispersion of inventive example 1.

The particle size distribution is shown in FIG. 3. The $d_{10}$, $d_{50}$, and $d_{90}$ values are reported in table 1.

Feed stream 1: 1737.3 g of an aqueous emulsion of 12.5 g of acrylic acid, 24.7 g of 2-hydroxypropyl acrylate, 24.5 g of styrene, 99 g of methyl acrylate, 100.3 g of methyl methacrylate, and 989 g of 2-ethylhexyl acrylate in deionized water, containing 58.6 g of emulsifier solution 1, 5.6 g of emulsifier solution 2, and 8.6 g of emulsifier solution 3.

Feed stream 2: 64.3 g of a 7% strength by weight aqueous sodium peroxodisulfate solution.

Feed stream 3: 18.8 g of a 10% strength by weight aqueous solution of tert-butyl hydroperoxide.

Feed stream 4: 15 g of a 10% strength by weight aqueous solution of sodium hydroxymethylsulfinate.

4. Inventive Example 2

Preparation took place in the same way as for inventive example 1, with the difference that the initial charge additionally contained 1.5 g of ascorbic acid.

The polymer dispersion obtained had a solids content of 58.7% by weight, a pH of 6, and an LT (0.01% by weight) of 46%. The glass transition temperature was −42° C. The viscosity was 350 mPa·s.

The $d_{10}$, $d_{50}$, and $d_{90}$ figures are reported in table 1.

5. Inventive Example 3

Preparation took place in the same way as for inventive example 1, with the difference that the seed dispersion was carried out over a period of 192 minutes, beginning 24 minutes after the start of feed stream 1. For neutralization, instead of 16.3 g of the 10% strength by weight aqueous ammonia solution, added successively were 12.5 g of 10% strength by weight aqueous sodium hydroxide solution and 7.25 g of 10% strength by weight aqueous ammonia solution.

The polymer dispersion obtained had a solids content of 59.4% by weight, a pH of 5.5, and an LT (0.01% by weight) of 49%. The glass transition temperature was −42° C. The viscosity was 380 mPa·s.

Figure 4:
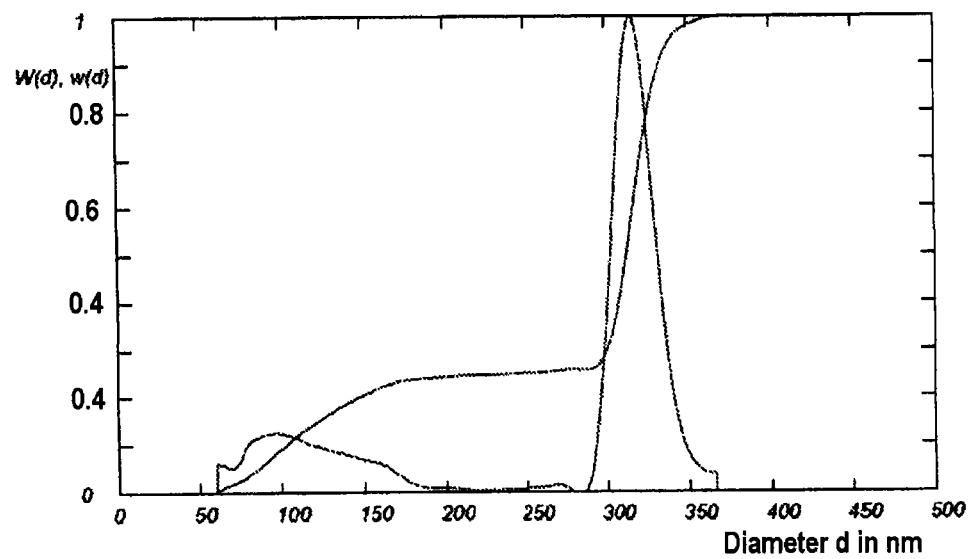
FIG. 4 is a graph showing particle size distribution w(d) of the polymer dispersion of inventive example 3.

The particle size distribution is shown in FIG. 4. The $d_{10}$, $d_{50}$, and $d_{90}$ figures are reported in table 1.

6. Inventive Example 4

A polymerization reactor was charged with 13.7 g of seed dispersion 2 in 188 g of deionized water. The mixture was heated to 85° C. 8.02 g of a 7% strength by weight aqueous solution of sodium peroxodisulfate were added, and, after a further 4 minutes, at 85° C., the addition of feed streams 1 and 2, which were metered in at a constant feed rate over 4 h, was commenced. During the addition, the temperature in the reaction mixture was maintained at 85° C. 90 minutes after the start of feed streams 1 and 2, respectively, 24.4 g of seed dispersion 1 were added in one portion. After the end of feed streams 1 and 2, a further 40 g of deionized water were added. This was followed by neutralization with 16.3 g of 10% strength by weight aqueous ammonia solution. A further 10 g of deionized water were added and then over an hour at 85° C. feed streams 3 and 4 were metered in. Subsequently 10.8 g of aqueous emulsifier solution 3 and 27.6 g of deionized water were added, and the batch was stirred at 85° C. for 15 minutes more and then left to cool to room temperature.

The polymer dispersion obtained had a solids content of 55.9% by weight, a pH of 6.2, and an LT (0.01% by weight) of 59%. The glass transition temperature was −42° C. The viscosity was 180 mPa·s.

The $d_{10}$, $d_{50}$, and $d_{90}$ figures are reported in table 1.

Feed stream 1: 1894.9 g of an aqueous emulsion of 12.5 g of acrylic acid, 24.7 g of 2-hydroxypropyl acrylate, 24.5 g of styrene, 99 g of methyl acrylate, 100.3 g of methyl methacrylate, and 989 g of 2-ethylhexyl acrylate in deionized water, containing 58.6 g of emulsifier solution 1, 5.6 g of emulsifier solution 2, and 8.6 g of emulsifier solution 3.

Feed stream 2: 64.3 g of a 7% strength by weight aqueous sodium peroxodisulfate solution.

Feed stream 3: 18.8 g of a 10% strength by weight aqueous solution of tert-butyl hydroperoxide.
Feed stream 4: 15 g of a 10% strength by weight aqueous solution of sodium hydroxymethylsulfinate.

7. Inventive Example 5

Preparation took place in the same way as for inventive example 4, with the difference that 9.15 of seed dispersion 2 were included in the initial charge, and, instead of the addition of 24.4 g of seed dispersion 1, 40 minutes after the start of feed stream 1, 30.5 g of seed dispersion were added.

The polymer dispersion obtained had a solids content of 55.6% by weight, a pH of 6.1, and an LT (0.01% by weight) of 69%. The glass transition temperature was −42° C. The viscosity was 170 mPa·s.

The $d_{10}$, $d_{50}$, and $d_{90}$ figures are reported in table 1.

8. Comparative Example 3

Commercial aqueous PSA dispersion of a polymer having the monomer composition stated for comparative example 1. The polymer dispersion had a solids content of 61.1% by weight, and a pH>5. The glass transition temperature was −42° C. The viscosity was 510 mPa·s.

Figure 2:
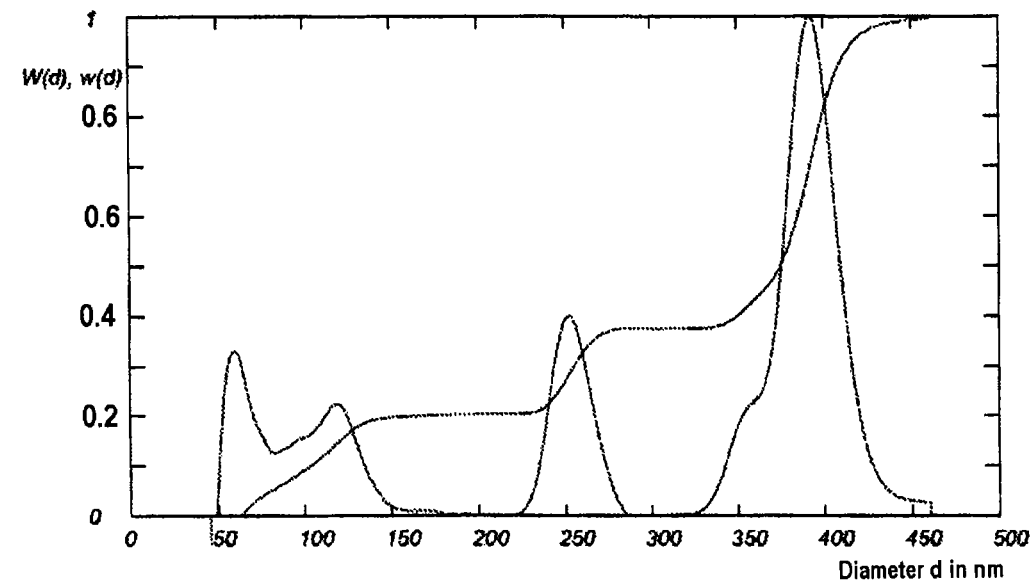
FIG. 2 is a graph showing particle size distribution w(d) of the polymer dispersion of comparative example 3.

The particle size distribution is shown in FIG. 2. The $d_{10}$, $d_{50}$, and $d_{90}$ figures are reported in table 1.

9. Comparative Example 4

Commercial aqueous PSA dispersion of a polymer having the monomer composition stated for comparative example 1. The polymer dispersion had a solids content of 60.9% by weight, and a pH>5. The glass transition temperature was −42° C. The viscosity was 550 mPa·s.

The $d_{10}$, $d_{50}$, and $d_{90}$ figures are reported in table 1.

TABLE 1

| | Particle size distribution | | | |
|---|---|---|---|---|
| Example | $d_{10}$ | $d_{50}$ | $d_{90}$ | Q |
| C1 | 111 | 317 | 723 | 1.92 |
| C2 | 126 | 258 | 626 | 1.93 |
| I1 | 101 | 299 | 318 | 0.72 |
| I2 | 115 | 316 | 334 | 0.69 |
| I3 | 102 | 312 | 333 | 0.73 |
| I4 | 73 | 209 | 228 | 0.74 |
| I5 | 87 | 95 | 208 | 1.28 |
| C3 | 101 | 376 | 407 | 0.81 |
| C4 | 49.3 | 342 | 363 | 0.91 |

C = comparative example,
I = inventive example

Performance Testing

1. Production of Test Strips

The dispersion under test was applied using a doctor blade in a thin layer to a siliconized paper and is dried at 90° C. for 3 minutes. The slot height of the doctor blade is chosen so as to give an application rate of 19-21 g/m² for the dried adhesive. A commercial PE film (100 μm, Corona pretreated) was placed on the dried adhesive and rolled on firmly using a manual roller. The film laminate thus produced is cut into strips 2.5 cm wide. These strips are stored for at least 24 hours under standard conditions prior to testing.

2. Determination of Whitening Behavior

Whitening behavior and moisture exposure is determined by the following method.

Strips of the coated film with a width of 25 mm were immersed in a water bath and a record was made of the time for their visual appearance to change. The hazing of the strips was evaluated visually after 30 seconds, 60 seconds, 5 minutes, 10 minutes, 20 minutes, 30 minutes, and 60 minutes. The evaluation was made according to a ratings scale from 0 to 4, where:
0 means no perceptible hazing
1 means very slight hazing
2 means distinctly recognizable hazing
3 means severe hazing
4 means very severe hazing The results are summarized in the table below.

TABLE 2

| | Whitening behavior | | | | | | | | |
|---|---|---|---|---|---|---|---|---|---|
| Time | Example | | | | | | | | |
| [min] | I1 | I2 | C1 | I3 | C2 | I4 | I5 | C3 | C4 |
| 0.5 | 0 | 0 | 0-1 | 0 | 0-1 | 0 | 0 | 0-1 | 0-1 |
| 1 | 0 | 0 | 1 | 0 | 1 | 0 | 0 | 1 | 1 |
| 5 | 0-1 | 1 | 2 | 0-1 | 1-2 | 0-1 | 0 | 2 | 2 |
| 10 | 1 | 1-2 | 2-3 | 1 | 2 | 0-1 | 0 | 3 | 2-3 |
| 20 | 1 | 2 | 3 | 1 | 2-3 | 0-1 | 0 | 3 | 3 |
| 30 | 1-2 | 2 | 4 | 1-2 | 3-4 | 1 | 0 | 4 | 4 |
| 60 | 2 | 2-3 | 4 | 2 | 4 | 1 | 0-1 | 4 | 4 |

3. Testing of Peel Strength as a Measure of Adhesion (Based on FINAT FTM1)

After the siliconized paper has been peeled off, the 2.5 cm wide film test strip is adhered to the test substrate. Ambient conditions: 23° C., 50% relative humidity. 1 minute after bonding (polyethylene substrate) or 24 hours after bonding (polyethylene or glass substrate), the strip is peeled at an angle of 180° and a speed of 300 mm/min with the aid of a tensile testing machine. The peel strength reported is the average force needed to achieve this, in N/2.5 cm, as the mean value of the results from three tests.

TABLE 3

| | Peel strength [N/2.5 cm] | | | | | |
|---|---|---|---|---|---|---|
| | | PE | | | Glass | |
| Example | Instantaneous | Fraction mode | 24 h | Fraction mode | 24 h | Fraction mode |
| I1 | 3.6 | A | 5.7 | A | 13.1 | A/C |
| I2 | 3.4 | A | 3.8 | A | 9.9 | A |
| C1 | 3.2 | A | 3.5 | A | 10.1 | A |
| I3 | 3.6 | A | 4.9 | A | 13.8 | A & C |
| C2 | 4.2 | A | 5.7 | A | 12.6 | A |
| I4 | 3.4 | A | 3.8 | A | 10.1 | A |
| I5 | 4.5 | A | 4.2 | A | 11.6 | A |
| C4 | 2.3 | A | 3.5 | A | 16.3 | C |

A = Adhesive fracture
C = Cohesive fracture

4. Test of Surface Tack (Loop Tack Based on FINAT FTM9)

The investigation takes place under ambient conditions: 23° C., 50% relative humidity. The release paper is peeled from the test strip. The two ends of the test strip are folded round to a length of approximately 1 cm, with the adhesive side inward. A loop is then formed from the test strip, with the adhesive side outward, and the two ends are held together and clamped into the upper jaw of a tensile testing machine. The test substrate is clamped into the lower jaw.

The adhesive strip loop is moved at a speed of 300 mm/minute and at an angle of 90° in the direction of the surface of the test substrate, so that the adhesive side of the test strip bonds to the substrate without additional pressure. The tensile testing machine is halted, and is moved upward again at the same speed as soon as the bottom edge of the upper jaw is located 40 mm above the substrate.

The loop tack reported is the average force required to achieve this, in N/2.5 cm, as a mean value from the results of three tests.

TABLE 4

| | Loop tack | | | |
|---|---|---|---|---|
| | Glass | | PE | |
| Example | [N/2.5 cm] | Fraction mode | [N/2.5 cm] | Fraction mode |
| I1 | 10.4 | A | 6.6 | A |
| I2 | 10.2 | A | 6.0 | A |
| C1 | 11.7 | A | 6.1 | A |
| I3 | 14.2 | A | 6.6 | A |
| C2 | 12.6 | A | 6.5 | A |
| I4 | 10.1 | A | 6.0 | A |
| I5 | 11.6 | A | 6.3 | A |
| C4 | 9.6 | A | 5.0 | A |

The invention claimed is:

1. A process for preparing an aqueous polymer dispersion, the process comprising:
performing free-radical aqueous emulsion polymerization of ethylenically unsaturated monomers M by a monomer feed process,
wherein the monomer feed process comprises:
adding at least 95% of the monomers to be polymerized under polymerization conditions to a first particulate seed polymer 1 located in the polymerization reactor, and
adding at least one further seed polymer 2 in the form of an aqueous dispersion to the polymerization reactor in the course of the polymerization to obtain the aqueous polymer dispersion,
wherein the aqueous polymer dispersion has a polymer content of at least 55% by weight, based on the total weight of the dispersion, in which the polymer comprises the ethylenically unsaturated monomer units M and has a glass transition temperature of below −10° C., and in which dispersed polymer particles have a polymodal particle size distribution,
wherein 10% to 60% by weight of the polymer particles have a particle diameter in a range from 70 to 180 nm and 40 to 90% by weight of the polymer particles have a particle diameter in a range from 180 to 350 nm, and
wherein the particle size distribution has a polydispersity index Q of from 0.5 to 1.5:

$$Q = \frac{d_{90} - d_{10}}{d_{50}}$$

in which
$d_{10}$ is a particle diameter below which 10% by weight of the polymer particles fall,
$d_{50}$ is a particle diameter below which 50% by weight of the polymer particles fall, and which is in the range from 90 to 320 nm,
$d_{90}$ is a particle diameter below which 90% by weight of the polymer particles fall, which is not more than 350 nm,
and all particle diameters are determined at 23° C. by centrifuging and discriminating according to mass fractions,
and wherein the monomers M, based on a total amount of the monomers M, comprise at least 65% by weight of at least one $C_2$-$C_{12}$ alkyl acrylate.

2. The process according to claim 1, the seed polymer 2 being added when 10% to 60% by weight of the monomers to be polymerized are located in the polymerization reactor.

3. The process according to claim 1, the seed polymer 1 being used in an amount of 0.1% to 2% by weight, based on the monomers to be polymerized.

4. The process according to claim 1, the seed polymer 1 having a weight-average particle size in the range from 10 to 150 nm.

5. The process according to claim 1, the seed polymer 2 being used in an amount of 0.05% to 2% by weight, based on the monomers to be polymerized.

6. The process according to claim 1, wherein seed polymer 1 and seed polymer 2 comprise vinylaromatic monomer units.

7. The process according to claim 1, wherein seed polymer 1 and seed polymer 2 comprise styrene.

8. The process according to claim 1, wherein seed polymer 1 and seed polymer 2 comprise $C_1$-$C_{10}$ alkyl acrylates and/or $C_1$-$C_{10}$ alkyl methacrylates.

9. The process according to claim 1, wherein seed polymer 1 and seed polymer 2 comprise butyl acrylate and methyl methacrylate.

10. The process according to claim 1, wherein less than 10% by weight of the polymer particles have a particle diameter of below 70 nm.

11. The process according to claim 1, wherein the polymer comprises at least 99% by weight of monoethylenically unsaturated monomer units M comprising:
a) 65% to 99.8% by weight of at least one monomer a), wherein said monomer a) is a $C_2$-$C_{12}$ alkyl acrylate;
b) 0.1% to 30% by weight of at least one monomer b) selected from the group consisting of methyl acrylate, a $C_1$-$C_{12}$ alkyl methacrylate, and a vinylaromatic monomer;
c) 0.1% to 10% by weight of at least one monomer c), wherein said monomer c) is a monoethylenically unsaturated monomer having at least one hydroxyalkyl group; and
d) 0% to 5% by weight of at least one monomer d), wherein said monomer d) is a monoethylenically unsaturated monomer having at least one acid group.

12. The process according to claim 1, wherein the polymer dispersion has a Brookfield viscosity, determined in accordance with DIN EN ISO 3219, at 20° C., 100 sec$^{-1}$, of not more than 1.5 Pa·s.

13. The process according to claim 12, wherein the Brookfield viscosity is from 0.05 to 1.5 Pa·s, determined in accordance with DIN EN ISO 3219 at 23° C., 100 sec$^{-1}$.

14. The process according to claim 1, wherein 15% to 50% by weight of the polymer particles have a particle diameter in a range from 70 to 180 nm and 50 to 85% by weight of the polymer particles have a particle diameter in a range from 180 to 340 nm.

15. The process according to claim 1, wherein 15% to 50% by weight of the polymer particles have a particle diameter in a range from 80 to 150 nm and 50 to 85% by weight of the polymer particles have a particle diameter in a range from 200 to 330 nm.

16. The process according to claim 1, wherein the polydispersity index Q is from 0.6 to 1.2.

* * * * *